United States Patent [19]
Stratigos et al.

[11] Patent Number: 5,724,574
[45] Date of Patent: Mar. 3, 1998

[54] METHOD AND APPARATUS FOR TRANSFERRING DATA TO A REMOTE WORKSTATION USING COMMUNICATIONS ESTABLISHED AS A BACKGROUND FUNCTION AT TIME WORKSTATION

[75] Inventors: William N. Stratigos; Richard S. Yien, both of New York, N.Y.

[73] Assignees: Remote Systems Company, LLC. Scarsdale; Empire Blue Cross/Blue Shield, NY, both of N.Y.; Wang Software N.Y., Inc.

[21] Appl. No.: 630,042

[22] Filed: Apr. 2, 1996

Related U.S. Application Data

[63] Continuation of Ser. No. 424,152, Apr. 17, 1995, Pat. No. 5,568,489, which is a continuation of Ser. No. 169,327, Dec. 17, 1993, Pat. No. 5,446,740.

[51] Int. Cl.⁶ ............................. G06F 15/00; H04J 3/12
[52] U.S. Cl. ............... 395/610; 395/612; 395/200.01; 395/200.08; 395/200.12; 370/118; 370/195; 379/89; 379/93
[58] Field of Search .................... 395/610, 612, 395/200.12, 200.01, 200.08, 841; 364/DIG. 1; 370/118, 195; 379/89, 93

[56] References Cited

U.S. PATENT DOCUMENTS

| | | | |
|---|---|---|---|
| 3,927,265 | 12/1975 | Roedel et al. | 179/2 DP |
| 4,051,326 | 9/1977 | Badagnani et al. | 179/2 DP |
| 4,893,248 | 1/1990 | Pitts et al. | 364/464.01 |
| 4,930,123 | 5/1990 | Shimizu | 370/94.1 |
| 4,973,952 | 11/1990 | Malec et al. | 340/825.35 |
| 5,002,491 | 3/1991 | Abrahamson et al. | 434/322 |
| 5,086,453 | 2/1992 | Senoo et al. | 379/93 |
| 5,179,651 | 1/1993 | Taaffe et al. | 395/154 |
| 5,200,993 | 4/1993 | Wheeler et al. | 379/96 |
| 5,282,208 | 1/1994 | Takayama et al. | 370/110.1 |
| 5,287,497 | 2/1994 | Behera | 395/600 |
| 5,321,520 | 6/1994 | Inga et al. | 358/403 |
| 5,325,310 | 6/1994 | Johnson et al. | 364/514 |
| 5,327,554 | 4/1994 | Palazzi, III et al. | 395/600 |
| 5,333,152 | 7/1994 | Wilber | 379/98 |
| 5,347,646 | 9/1994 | Hirosawa et al. | 395/575 |
| 5,446,740 | 8/1995 | Yien et al. | 370/110.1 |
| 5,568,489 | 10/1996 | Yien et al. | 370/110.1 |

FOREIGN PATENT DOCUMENTS

| | | |
|---|---|---|
| 0433077 | 6/1991 | European Pat. Off. . |
| 0446149 | 9/1991 | European Pat. Off. . |
| 0512174 | 11/1992 | European Pat. Off. . |
| 9004837 | 5/1990 | WIPO . |
| 9102313 | 2/1991 | WIPO . |

OTHER PUBLICATIONS

Data Compression and Database Performance, Graefe et al., Kansas City, Missouri, Apr. 3-5 1991.

International Search Report, Application No. PCT/US 94/14785, 2 pages, 1994.

*Primary Examiner*—Thomas G. Black
*Assistant Examiner*—Jean Raymond Homere
*Attorney, Agent, or Firm*—Darby & Darby

[57] ABSTRACT

A method and apparatus for processing at a remote workstation, data files that are compressed and collected into groups on a local area network at a central location. The files of a group are transferred to the workstation over an ISDN switched telephone network in response to an automatic requests from the workstations. The workstation requests depend on the inventory of unprocessed files at the workstation as well as the time and date, in order to reduce the connection time. When files are received at the workstation the first is immediately decompressed and presented to the operator. In the meantime the next file which the operated is expected to need is decompressed in the background and is ready for processing as soon as the operator finishes with the first. When the operator switches to the next file the processing results are automatically saved and a further file is decompressed an held in a que for the operator.

9 Claims, 5 Drawing Sheets

METHOD AND APPARATUS FOR TRANSFERRING DATA TO A REMOTE WORKSTATION USING COMMUNICATIONS ESTABLISHED AS A BACKGROUND FUNCTION AT TIME WORKSTATION

This is a continuation of application Ser. No. 08/424,152, filed Apr. 17, 1995, which is a continuation of application Ser. No. 08/169,327, filed Dec. 17, 1993, now U.S. Pat. No. 5,446,740.

BACKGROUND OF THE INVENTION

The invention relates to high performance remote data processing and, more particularly, to a method of and apparatus for the effective remote assignment, transmission, processing, collection, and management of documents which can be represented as digital data.

Many industries require the processing and management of a large number of documents. These documents are typically paper, but can also include other physical media, such as photographs, audio or video recordings, art works, physical evidence, etc. Much of the information in these documents may be converted into a digital format and stored into a computer system via a variety of techniques, such as digital scanning for paper and photographs and digital recording for audio and video. In addition, there are many source documents which are native to a computer environment, such as word processing and spreadsheet files or a record from a computer database. Documents which are composed of one or more of these different data types can be referred to as electronic or digital documents.

While the concept of electronic or digital documents is not new, the increasing use of digital imaging techniques to acquire and store business records, as well as the prevalence of personal computing data at the office, presents a series of technical opportunities and challenges for the efficient distribution and comprehensive management of such documents.

For instance, it is often desirable to grant remote access to electronic documents so that employees may work at home or some other remote location. Having employees work at home is becoming increasingly popular because it provides benefits to both the employer and the stay-at-home employee. So called, "telecommuting" employees can save a firm a great deal of overhead expense in terms of office space. Telecommuting also allows a firm to hire talented workers who could not otherwise work in the office setting. For example, employees with a long-term illness or physical handicap, or parents with small children may enthusiastically work at home because of the flexible work schedule, but could not conveniently work in an office.

Giving a remote employee access to the digital electronic documents upon which they must work presents several technical problems. These documents can be very large in size in terms of the number of digital bits they represent. The size of a typical bi-level 8.5"×11" page scanned at 200 dots per inch can range from 5K bytes to 200K bytes depending upon the amount of information contained on the scanned page. An average compressed image size could be 50K bytes. Color and gray scale images can be an order of magnitude larger, and audio/video recordings an order of magnitude larger again. This contrasts sharply with typical ASCII data transmissions which are less than 2K per terminal screen in size.

Secondly, in many occupations, a remote employee will be rated or compensated based on productivity, such as the number of forms processed per hour. Because the document is delivered to the remote employee via the transmission and display of digital data, the workstations through which the remote employees work must be capable of a sufficiently high level of performance that they do not impede the employee's productivity. Assuming that the performance of a workstation in the central office is adequate for the requisite productivity, the remote workstations have the problem of maintaining performance levels while coping with the additional task of receiving and transmitting the data over a considerable distance.

These issues of electronic document data size and high workstation performance are typically solved by the use of higher bandwidth telecommunications facilities. While very high bandwidth facilities are available from a local phone company, they can also be prohibitively expensive. A practical economic alternative for a small remote site is a medium bandwidth "switched line" digital service. The "switched line" offered by the telephone company has one transmission wire installed between the remote site and the phone company and another wire installed between the phone company and the central office. As with typical voice telephone service, the phone company connects the two sites on an "on-demand" basis and charges for the connection based on a series Of call factors, including the time of day and the duration of the connection. Thus, like any other business expense, it becomes highly desirable to minimize the ongoing cost of the telephone service required to support the transmission of these electronic documents.

One type of medium bandwidth switched line is the Integrated Services Digital Network ("ISDN") which has three transmission channels, two of which transfer data at a 64K band rate (the so called "B channels") and one of which transfers data at 16K band, for a total 144K baud bandwidth. U.S. Pat. Nos. 4,930,123 of Shimzu and 5,200,993 of Wheeler et al. describe the communication of data to remote workstations using ISDN lines.

Further problems are presented to the employer of a team of remote employees. In order to manage, control, and compensate the activity of the remote employees, the employer must have the capability of efficiently making work assignments of the digital documents, and monitoring and managing the progress of the assignments. This gives the employer the ability to make sure that the work is completed in a timely and cost effective manner and that an individual worker's activity is assessed and compensated accurately. The accomplishment of this work management in a distributed remote environment can be greatly enhanced by the use of automated processes for work assignment, monitoring, accounting, and compensation.

SUMMARY OF THE INVENTION

The present invention is directed to solving the foregoing and other problems involved in remote workstations by improving the efficiency with which document data is assigned, transmitted, and collected to and from these workstations, as well as ensuring that optimal workstation performance is maintained while work is being processed.

Thus, it is an object of the present invention to provide high performance remote access to digital electronic documents on a network.

It is another object of the invention to reduce the overall cost of transmission over a switched communications medium when accessing a series of digital documents.

It is still a further object of the invention to minimize the amount of idle time for a worker at a remote workstation such that worker productivity can be maximized.

It is an object of the invention to simplify management of remote workstations by automatically assigning, distributing, tracking, and collecting digital documents.

In an illustrative embodiment of the invention, a method of and apparatus for, utilizing a remote high-performance workstation system involves processing a series of digital documents that are accessed at a central location. The method and apparatus also automatically assign and manage such documents for transmission of the documents to the remote sites from the central office.

Digital documents are stored on a computer or network of computers as document files at the central location. The document files are compressed to save storage space and reduce transmission time. The computer system examines the digital documents available on the system and then, based on a set of predetermined criteria, assigns some or all of the documents to a remote employee or a group of remote employees. In addition, the system identifies the particular digital pages of each document which are required by the employee or group of employees to accomplish the assigned business processing. For digital scanned images the system can also identify particular areas of an image, called "clippings", which are required for processing, and only transmit those instead of the entire digital page. These methods help to minimize the transmitted data, which in turn increases performance of, and minimizes transmission costs for, the remote workstation.

Compressed data files of the digital documents may be sent to the remote workstation automatically, where they are made into an inventory of work. A central processor on the network keeps track of the documents sent to the remote location. The remote user decompresses the files in inventory one at a time and processes them.

A remote employee's workstation computer may be programmed to maintain a certain level of work in inventory. As the remote employee processes documents, the amount of work in inventory decreases. When the amount of work falls below a particular threshold level, the remote computer automatically requests an additional volume of work by placing a call, i.e., establishing a telecommunications link, to the central office. By default, this call will be placed at a time scheduled to minimize the cost of the data transfer or to coordinate access to a limited amount of computing or telecommunications facilities at the central office. Only those pages of the digital documents which have been assigned to the remote employee or the group to which he or she belongs, and which are required for the business data processing, will be automatically transmitted to the remote workstation. Information is recorded in the central computer to indicate the status of these documents for the purposes of management reporting. In addition, any data that had been modified in the course of processing the inventory at the workstation, as well as the status for documents previously transmitted to the workstation, will be sent back to the central office during this data call.

Because the data call is deferred until a minimum volume of work is required, and because updates to the central office data base are deferred until the next data call is placed, the bandwidth utilization of any given data call is nearly 100 percent, assuring minimal connection time. Stated differently, there is never any idle connect time during a call between the remote site and the central site when using this method, thus minimizing the associated cost of the call.

To make more efficient use of the computing hardware at the remote site, the user may be processing data documents from the inventory at the workstation, while a data call is in progress. Also, as soon as the first page of the first document is received by the workstation, it can be made available to the user for processing, assuming there is no remaining inventory or this document is needed immediately for some other reason, e.g., it is a priority matter. As the user works, the workstation continues to receive new pages and documents from the central office. When the last document transmission is completed and the status and change data has been sent back to the central office, the data call is automatically terminated. Because the transmission task is completed in the background, the performance which the remote employee experiences is identical to that of a workstation connected to a local area network ("LAN") at the central office.

In addition, further performance enhancements are obtained through the use of anticipatory processing when work flow is reasonably predictable. As an example, while the remote employee views and processes a given document, the software at the workstation automatically selects the next document file available and decompresses it in the background. When the user has completed work on the current document, the user can switch to the next document with minimal delay.

At the central office, the computer stores information regarding the state of every document in the system, i.e. at the central office LAN and at all of the remote workstations. It also stores information on the processing history of the documents. As documents complete each processing step, the system can automatically update a payroll system to indicate that a particular remote worker should receive compensation for the processing work completed. In addition, other statistics are automatically retained on worker productivity and can be transferred to a human resources system for use in: evaluating local and remote worker output and quality.

BRIEF DESCRIPTION OF THE DRAWINGS

The foregoing and other features of the present invention will be more readily understood from the following detailed description taken together with the accompanying drawings, in which.

DETAILED DESCRIPTION OF THE PREFERRED EMBODIMENT

Figure 1:
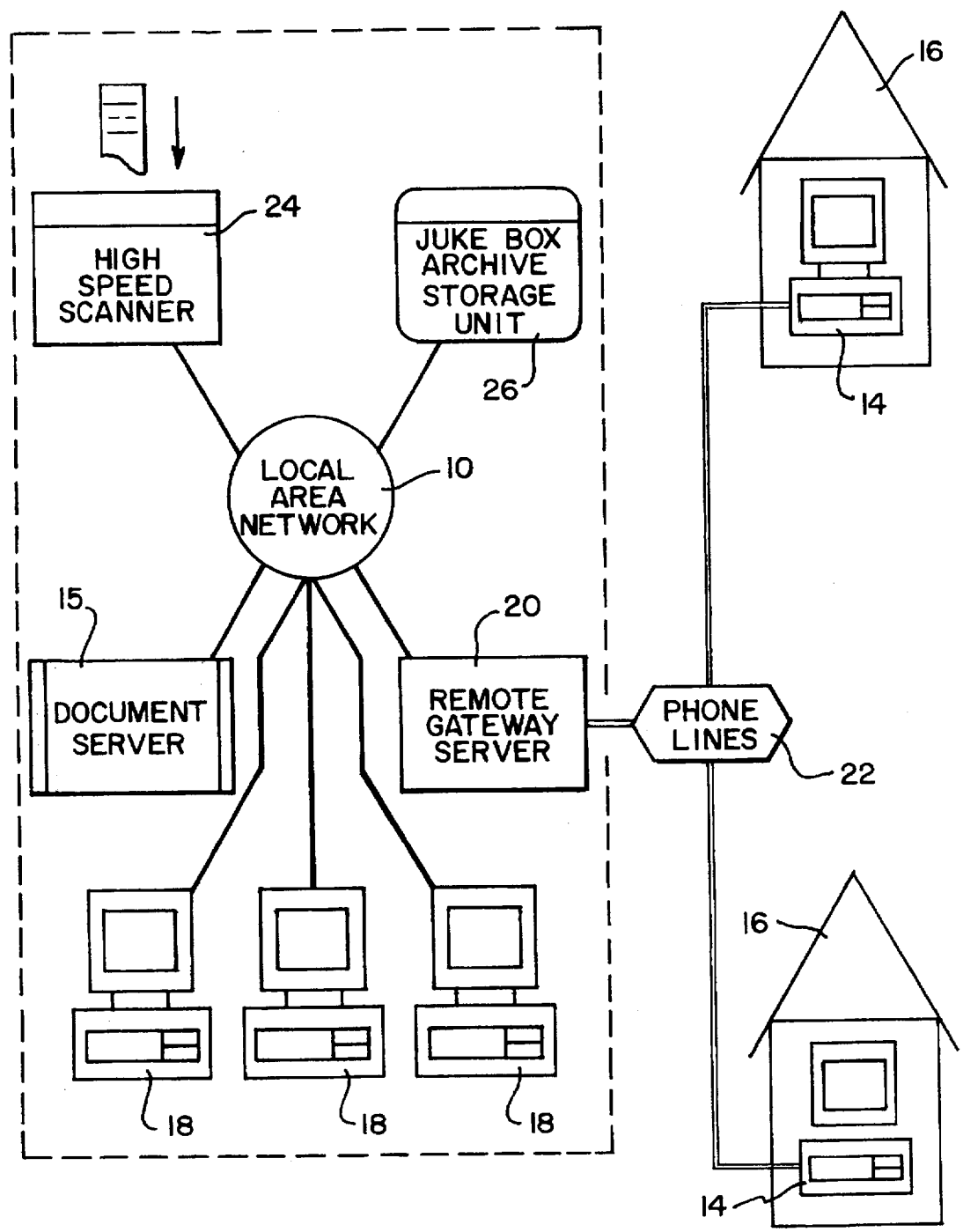
FIG. 1 is a block diagram illustrating a hardware arrangement for practicing the method of the present invention.

The system of the present invention involves two major components, as shown in FIG. 1: a local area network, i.e. LAN, 10 located at a central office 12, and remote workstations 14 located at remote sites 16. At the central office 12 a document server 15 and local workstations 18 are connected on the LAN 10. Also present on the LAN 10 are a high-speed scanner 24 and an archive storage unit 26. The archive storage unit 26 can be a "jukebox" type optical storage unit, which can store millions of electronic documents on a series of optical disks that are selected using a jukebox type disk changer mechanism.

On the network is a remote gateway server 20, which may be an ISDN gateway server. Server 20 connects the LAN to the remote workstations, e.g. over ISDN lines 22.

Figure 2:
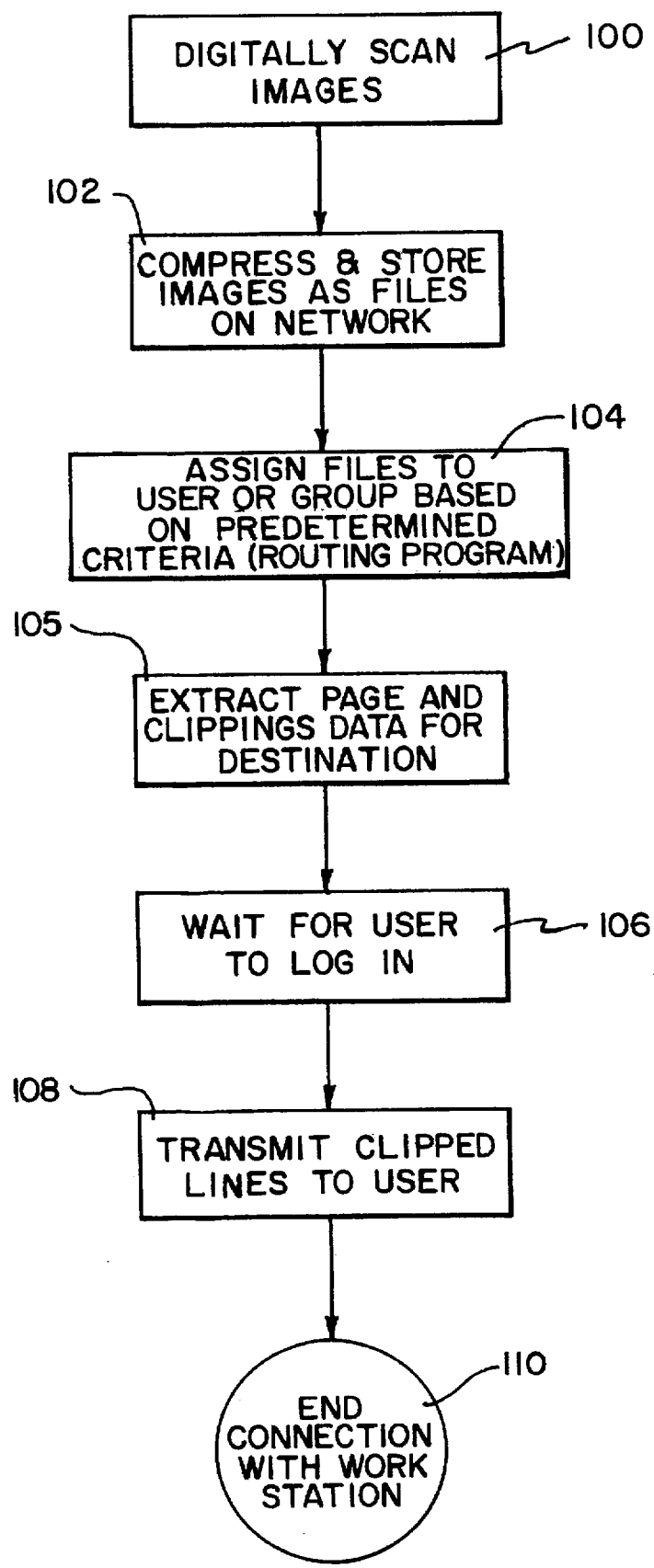
FIG. 2 is a flow chart illustrating a portion of a method according to the invention, for sending work to a remote workstation.

FIG. 2 illustrates the program controlled procedure for sending work to an employee at a workstation 14 at remote a site 16. This procedure is under the control of a program stored on the document server 15 at the central office. According to this procedure, the documents are digitally scanned (step 100) using the high-speed scanner 24. The scanned images are compressed and stored as image files (step 102), in order to drastically reduce their size. The uncompressed image file for a scanned image of a document that has considerable "white space", such as a form, can occupy more than 10 times the storage space of the image file when in compressed form.

The compressed image files are loaded onto a network device, such as the document server 15. If a large number of images are scanned at once, or if they are to be stored for an extended period of time, they may be stored in another network device, such as the archive storage unit 26.

As new documents are received by the document server 15, a program executing on the document server, known as a document router, evaluates the characteristics of each document and compares them against a set of predetermined criteria called "routing rules", which have been established and represented in a database (step 104). These rules could consist of any information that would allow the selection of certain documents which are suitable for a particular remote user (employee) or group of workers to process. For example, the files may be selected according to type, such as a Medicaid form, location of the client, date of the form, or any other criteria. Associated with each rule is a named "destination" which describes a user or group of users or a computer program assigned to perform business data processing for a given document.

Figure 3:
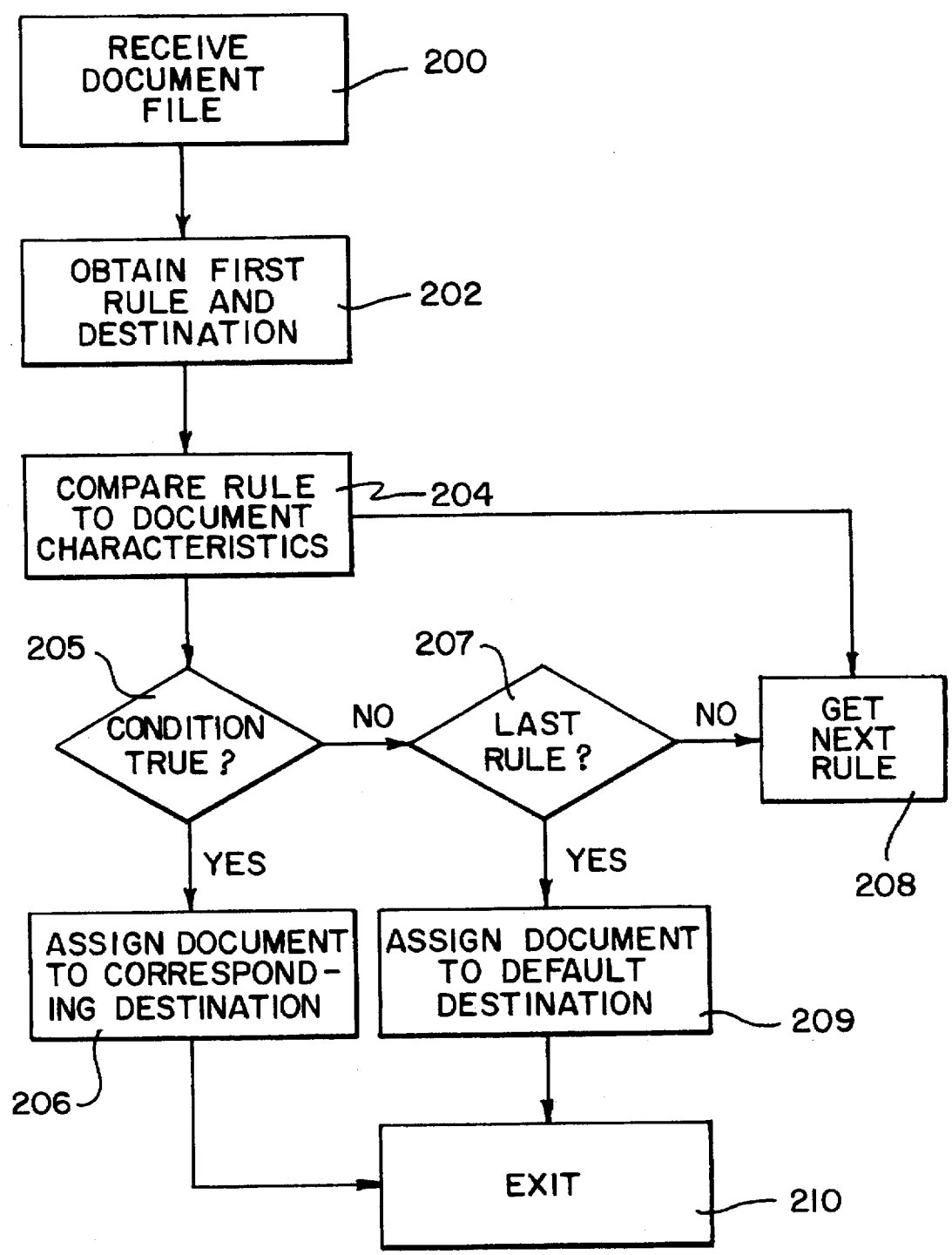
FIG. 3 is a flow chart illustrating a portion of a method carried out at a remote site, according to the invention, for routing documents in the system.

FIG. 3 illustrates the document router program of step 104 in FIG. 2 in further detail. For the first document received by the document router (Step 200), a first rule and its associated destination is obtained from the rules database (Step 202). The rule is compared with the data characteristics of the document (Step 204). For instance, a sample rule might be: "DOCUMENT TYPE is a Medical Claims Form and the TOTAL CLAIM AMOUNT field is greater than $1,000" with an associated destination of SUPERVISOR. If the rule condition was evaluated to be TRUE (Step 205) for a given document, then the document would be assigned a destination of "SUPERVISOR" (Step 206) and the program would exit (Step 210) back to the routine of FIG. 2. If the rule condition is not true, the next rule in the rules database would be obtained (Step 208). It would then be compared to the document characteristics (Step 204). This loop would continue until a destination was determined, based on finding a match between the rule and the document characteristics. If after the last rule in the rules database has been compared (Step 207), there is no rule in the database that is a match, a default destination is assigned (Step 209) and the program exits.

Returning to FIG. 2, associated with each possible destination are a set of page selection and clipping extraction definitions for each possible type of document. The particular pages and clippings associated with the destination are extracted from the document (Step 105). The clipped document files are then held on the document server until remote users, who are associated with the various destinations, sign on and request documents to work on (step 106). When the remote user login is complete, the files assigned to a destination associated with a particular user are then transferred from the document server to the remote workstation for processing (Step 108). When this transfer is complete, the user connection to the document server is terminated (Step 110).

Figure 4:
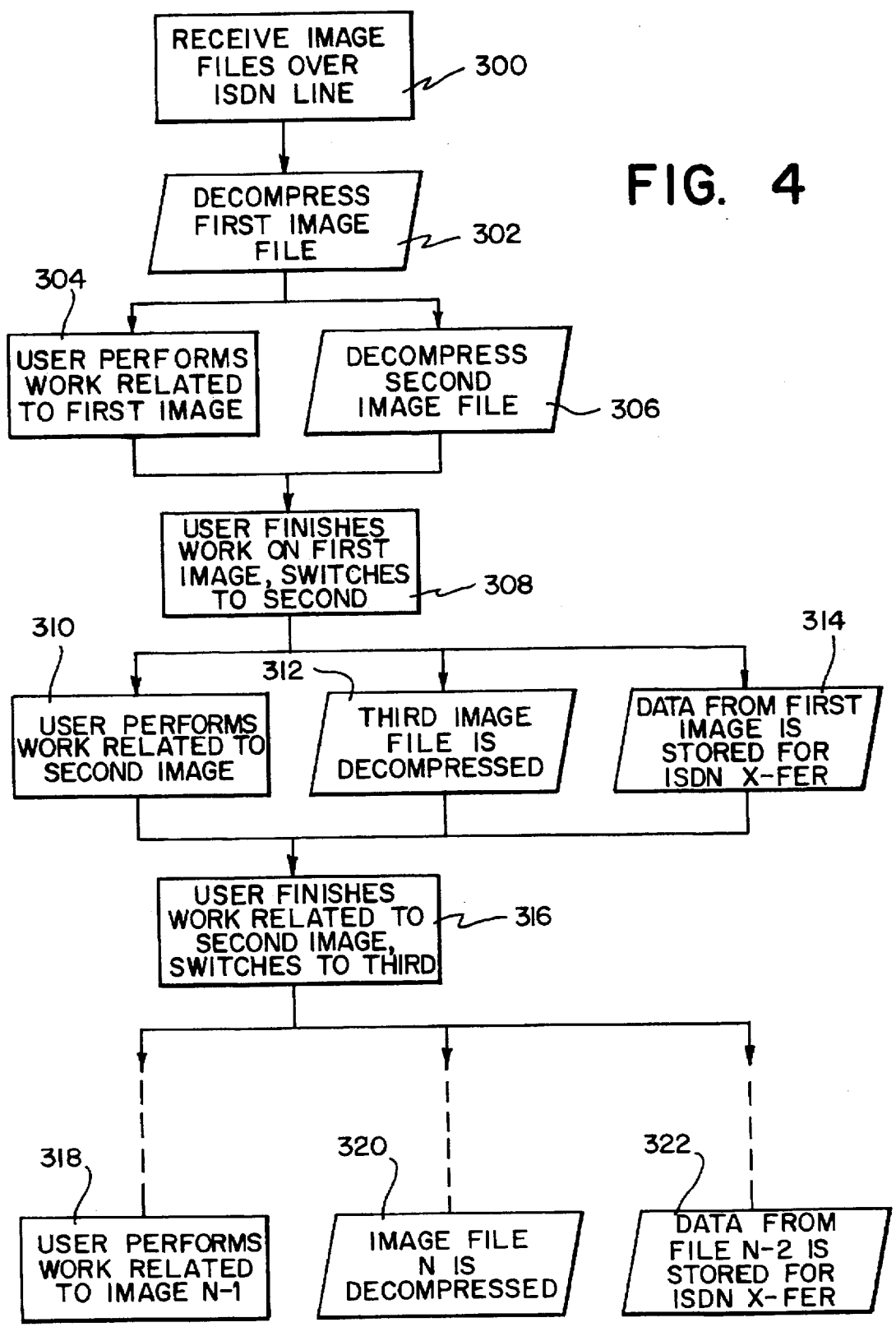
FIG. 4 is a flow chart illustrating anticipatory processing of data files.

Another portion of the program that operates the system according to the invention is stored at the remote workstation 14. This program is illustrated by FIG. 4. According to the program, the image files are first received over an ISDN line (step 300). Since the image files received at the remote workstation 14 are in compressed form, each image file is decompressed automatically in order for the remote user to view the image and perform work relevant to the image (Step 302). Once the first image file is decompressed, the remote user can begin work on that file.

While working on each image file (Step 304), the remote user occupies very little of the workstation processor time. For example, while the user is typing data that is relevant to the first image into the workstation, the majority of the processor time is spent waiting for the next character to be typed. This time can be utilized, in part, for decompressing the next image file (Step 306)so that the next image will be available for viewing when the remote user finishes working on the first image.

When the user finishes work relevant to the first image, the user switches to the second image which has already been decompressed and can thus appear on the screen almost instantaneously (Step 308). Since the second image is stored in RAM after its decompression, the speed with which the user can switch to the second image is limited only by the monitor refresh time. By anticipating the need for the second image while the user is working on the first image, the user can continue work from the first image to the second without interruption. The idle time of the user is thereby greatly reduced.

After the user switches to the second image, the user can being work related to the second image (Step 310). While the user performs work related to the second image, the third image file is decompressed (Step 312) and the data created during the processing of the first image is stored (Step 214). Therefore, the delay time is reduced when switching images by eliminating at least two sources of delay: (1) delay in decompression of the next image, and (2) delay in saving the data related to the previous image.

When the user finishes work on the second image, he switches to the third image (Step 316). This process continues while the worker goes through the files in the inventory at his workstation. For a group of N images, as the user works on the next-to-the-last image (N−1) (Step 318), the last image (N)is decompressed (Step 320), and the data related to second to the last image (N−2) is stored (Step 322).

After work is performed relating to all images, an ISDN connection can be established between the remote workstation and the ISDN gateway to communicate to the central office the data developed by the remote user related to the images using the automatic transfer program described previously. The images themselves will not need to be transmitted back to the network unless they have been changed in some way at the remote workstation, because the central office network retains copies of the images.

It should be noted that the present invention is effective in part because of the anticipation of workflow. This is most possible, and the benefits of the invention are greatest, where work may progress in a predictable fashion. As an example, a clerk who processes credit card applications for a particular region of the country by entering the data written on the application into a mainframe application can be assigned a continuous stream of new applications by the document router. The system can anticipate that when one application is processed, the operator will ask for the next one assigned. Because of this, the system can prepare the next document by ensuring that it has been transferred from the server, decompressed, and is really for viewing by the time the remote workstation operator actually needs it. It may also be a requirement of the program to prioritize documents, e.g., to present first the most important or critical documents or the oldest documents. Thus, the program anticipates which document and which portion of the document will be needed next. The anticipated document is decompressed in RAM at the workstation before it is needed and while the user is working on a previously requested or anticipated document.

Naturally there may still be occasions where the user wishes to view a document out of the anticipated sequence. In such a case the document is available, but the user must wait for the images of the documents in the file to be transferred and decompressed, perhaps in the anticipated order.

Figure 5:
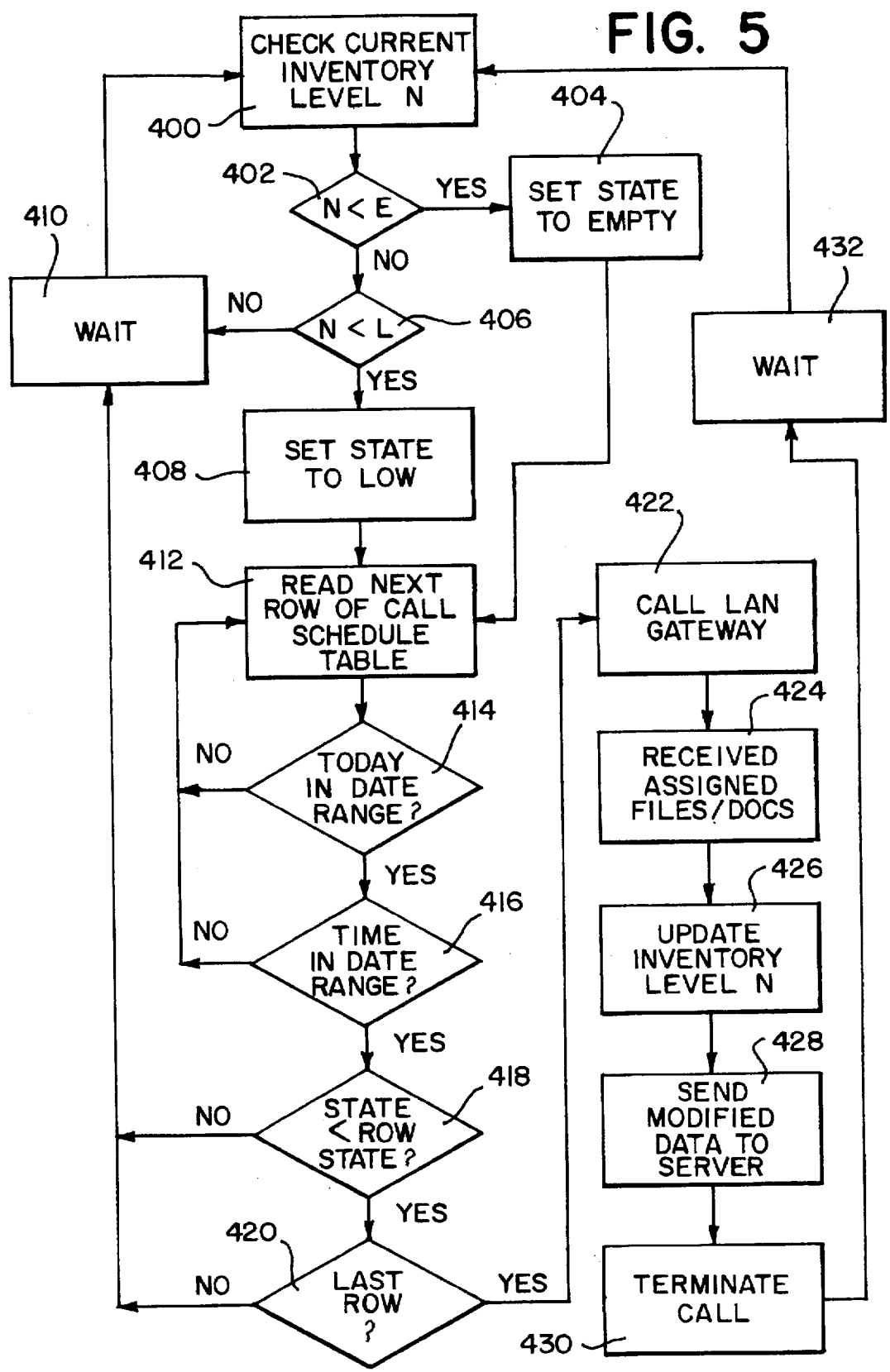
FIG. 5 is a flow chart that illustrates inventory management processing at a remote site.

The process of transferring documents to a remote user workstation is largely hidden from the remote workstation operator by a program stored on the remote workstation which executes in the background while the user is processing documents in the foreground. The logic for this program is depicted in FIG. 5. This program maintains a count of the current inventory of documents to process on the remote workstation. Associated with this inventory are three user-configurable threshold values used to determine if an automatic call to the central office is required. In ascending value, they are termed the "empty", "low", and "high" thresholds. In addition, there is a user-configurable table called the "call schedule table" which has the following format, as an example:

| Row No. | Day | Time | State | Comment |
|---|---|---|---|---|
| 1 | 2-6 | 9:00-18:00 | Empty | Peak rate only when empty |
| 2 | 2-6 | 18:00-9:00 | Low | Off-peak if low |
| 3 | 2-6 | 10:00-11:00 | None | Block weekday peak even hours |
| 4 | 2-6 | 12:00-13:00 | None | Block weekday peak even hours |
| 5 | 2-6 | 14:00-15:00 | None | Block weekday peak even hours |
| 6 | 2-6 | 16:00-17:00 | None | Block weekday peak even hours |
| 7 | 7-1 | 0:00-0:00 | Low | Anytime weekend if low |

The first column, called "Day", of this table is a numeric range code for the day of the week with Sunday coded as day "1". For example, "2-6" in the table stands for Monday through Friday. The second column, called "Time", is a time of day range indicated with military time format. The third Column, call "State", is one of the values None, Empty, or Low. The value "None" is used to indicate that automatic calling is not permitted for the given period. The value "Empty" is used to indicate that automatic calling is only permitted if the Current Inventory is below the Empty Threshold value. Finally, the value "Low" is used to indicate that automatic calling is permitted if the Current Inventory is below the Low Threshold value. The comment field is used to describe the purpose of that row in the table.

The call management program works by periodically checking to see how many unprocessed documents are in its current inventory (Step 400). This period is user-configurable and would typically be set for 5 minute intervals. It then evaluates the state of the inventory by comparing it against the empty threshold (Step 402). If the current inventory is below this threshold, then the state of the inventory is set as "Empty" (Step 404). If the inventory is not below this threshold, then it's level is compared against the low threshold (Step 406). If the current inventory is be low this threshold, then the state of the inventory is considered "Low" (Step 408). If the inventory is not below this level, then the program exits to wait until the next period begins (Step 410).

If the inventory state is either Empty or Low, the program will proceed to scan each row of the call schedule table (Step 412). The processing for each row can be described as follows: if the current day is not within the day range of the row, proceed to the next row (Step 414). If the current time is not within the time range of the row, proceed to the next row (Step 416). If the current day is within the day range (yes at Step 414) and the current time is within the time range for a row (yes at Step 416), then if the current inventory state is less than or equal to the state level of the row (Step 418), proceed to the next row. If the current inventory state is greater than the state level of the row (Step 418), then the program will exit and wait (Step 410) until the next period to repeat this procedure. If all the rows of the table have been processed successfully (Step 420), then proceed with automatic calling of the LAN gateway (Step 422).

In the example call schedule table, row nos. 1 through 6 are configured to control call scheduling from Monday through Friday as follows:

Calls may be placed from 9 am–10 am, 11 am–12 pm, 1 pm–2 pm, 3 pm–4 pm, 5 pm–6 pm from Monday through Friday if the remote workstation is Empty. Calls may be placed 6 pm–9 am from Monday through Friday if the remote workstation is Low on work. The effect of rows 1 and 2 is to defer calling during peak rate hours until it is absolutely required. For instance, if the remote workstation becomes Low on work at 5:30 pm, the call schedule table will defer calling until either the workstation is Empty or until 6:00 pm. The effect of rows nos. 3 through 6 is to block calling during office hours which start with an even number. Presumably, other remote workstations are configured for the converse situation, i.e., to block calling during office hours which begin with an odd number. The last row no. 7 indicates that calls may be placed anytime on Saturday or Sunday if the remote workstation becomes Low on work. This kind of configuration permits scheduled, efficient sharing of a limited number of host phone lines.

The workstation will then automatically call the LAN gateway using a pre-stored phone number, user id, and security password to establish a data connection. It will then receive files which have been assigned to the remote workstation operator (Step 424) until the inventory level equals the "high threshold" (Step 426). It will also transmit any modified data from processed documents back to the document server (Step 428) for access by other users and for re-assignment by the document routing program. When this data transfer has been completed, the call is automatically terminated (Step 430) and waits for the next inventory check (Step 432).

The procedures described above provide many advantages over a manual calling process. First, the call schedule table can be configured to automatically call when the phone rates are lowest. This obviously reduces the overall cost of operating a remote workstation. Second, utilization of the lines into a LAN gateway can be maximized by scheduling remote workstation access. For instance, given one (1) incoming line for the LAN gateway and four (4) remote workstations, it is beneficial for the remote workstations to coordinate their calling to minimize retries and possible work starvation situations by configuring the call schedule table such that each workstation is permitted to call the LAN gateway in a different 15 minute interval. This increased utilization of the LAN gateway permits fewer LAN gateway phone lines to be configured for a given number of remote workstation users, again reducing the costs of operation. Third, the whole process of connection to the central site is hidden from the remote workstation operator, simplifying workstation operation and increasing productivity.

While the invention has been particularly shown and described with reference to preferred embodiments thereof, it will be understood by those skilled in the art that various changes in form and details may be made therein without departing from the spirit and scope of the invention.

What is claimed is:

1. A communications method established as a background function of a remote workstation to which a plurality of discrete data files are transferred from a central location while data processing is enabled in the foreground, said communications method comprising the steps of:

initiating, according to predetermined criteria, a connection over the communication lines from the remote workstation to the central location without user intervention as a background function;

identifying a group of data files on which the user is to perform data processing in the foreground;

transmitting the group of data files to the remote workstation as a background function; and terminating the telephone connection after the transfer is complete.

2. The method of claim 1 wherein the criteria involves the time of day.

3. The method of claim 2 wherein the criteria involves the day of the week.

4. The method of claim 1 further including the step of monitoring the volume of unprocessed data files available on the remote workstation.

5. The method of claim 4 wherein the step of initiating is made when the volume of unprocessed data files is at or below a particular level.

6. A workstation remote from a central location at which data files are located, comprising:

means at the workstation for coordinating access to data files at the central location without user intervention as a background function while the workstation is enabled to perform a foreground process, said coordinating means including:

means for requesting at least one group of data files from the central location;

means for receiving a group of data files transferred in response to the request;

means for causing a received file to be available for processing;

means for monitoring a volume of unprocessed data files at the workstation; and means for controlling said means for requesting files so that a request is made in response to an indication from said monitoring means that the volume is below a particular level.

7. A communications method established as a background function of a remote workstation to which a plurality of discrete data files are transferred from a central location while data processing is enabled in the foreground, said communications method comprising the steps of:

initiating, according to predetermined criteria, a connection over the communication lines from the remote workstation to the central location without user intervention as a background function;

indicating to the central location that the remote station is ready to receive data files on which the user is to perform data processing in the foreground;

transmitting a group of data files to the remote workstation as a background function; and terminating the telephone connection after the transfer is complete.

8. The method of claim 7 further including the step of monitoring the volume of unprocessed data files available on the remote workstation.

9. The method of claim 8 wherein the step of initiating is made when the volume of unprocessed data files is at or below a particular level.

* * * * *